US012624200B2

(12) United States Patent
Antensteiner et al.

(10) Patent No.: US 12,624,200 B2
(45) Date of Patent: May 12, 2026

(54) DENSITY AND CHEMICAL COMPOSITION CONTROL FOR POLYMER WITH GOOD STRESS CRACK PROPERTIES

(71) Applicant: ExxonMobil Chemical Patents Inc., Baytown, TX (US)

(72) Inventors: Martin Antensteiner, Houston, TX (US); Nathaniel B. Guy, Sewickely, PA (US); Porter C. Shannon, Seabrook, TX (US); Richard E. Pequeno, Baytown, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 720 days.

(21) Appl. No.: 17/997,007

(22) PCT Filed: Apr. 13, 2021

(86) PCT No.: PCT/US2021/027063
§ 371 (c)(1),
(2) Date: Oct. 24, 2022

(87) PCT Pub. No.: WO2021/221904
PCT Pub. Date: Nov. 4, 2021

(65) Prior Publication Data
US 2023/0250264 A1 Aug. 10, 2023

Related U.S. Application Data

(60) Provisional application No. 63/016,889, filed on Apr. 28, 2020.

(51) Int. Cl.
$C08L\ 23/06$ (2006.01)
$C08F\ 2/01$ (2006.01)
$C08F\ 210/16$ (2006.01)
$C08J\ 5/18$ (2006.01)

(52) U.S. Cl.
CPC ................ C08L 23/06 (2013.01); C08F 2/01 (2013.01); C08F 210/16 (2013.01); C08J 5/18 (2013.01); *C08J 2323/08* (2013.01); *C08L 2203/16* (2013.01)

(58) Field of Classification Search
CPC ........ C08L 23/06; C08L 2203/16; C08F 2/01; C08F 210/16; C08F 4/65912; C08J 5/18; C08J 2323/08
See application file for complete search history.

(56) References Cited

U.S. PATENT DOCUMENTS

| | | | |
|---|---|---|---|
| 5,352,749 A | 10/1994 | DeChellis et al. | |
| 5,525,695 A | 6/1996 | Lai et al. | |
| 5,763,543 A | 6/1998 | Muhle et al. | |
| 6,255,426 B1 | 7/2001 | Lue et al. | |
| 7,696,289 B2 | 4/2010 | Fischbuck et al. | |
| 7,951,873 B2 | 5/2011 | Best et al. | |
| 2003/0232935 A1 | 12/2003 | Kendrick et al. | |
| 2005/0137364 A1 | 6/2005 | Cai et al. | |
| 2005/0182207 A1 | 8/2005 | Singh et al. | |
| 2007/0260016 A1 | 11/2007 | Best et al. | |
| 2011/0212315 A1 | 9/2011 | Fantinel et al. | |
| 2012/0053308 A1 | 3/2012 | Garroff et al. | |
| 2015/0065669 A1 | 3/2015 | Hlavinka et al. | |
| 2015/0125645 A1 | 5/2015 | Cheng et al. | |
| 2015/0232589 A1* | 8/2015 | Best .................... B32B 27/32 | |
| | | | 525/240 |
| 2017/0355791 A1 | 12/2017 | Savatsky et al. | |
| 2018/0104942 A1* | 4/2018 | Shen .................... B32B 5/022 | |
| 2019/0002676 A1 | 1/2019 | Banat | |
| 2019/0010261 A1 | 1/2019 | Banat | |

FOREIGN PATENT DOCUMENTS

| | | | |
|---|---|---|---|
| CN | 115260368 A | 8/2023 | |
| WO | 20150116381 A1 | 8/2015 | |
| WO | WO2015116381 | * | 8/2015 |

OTHER PUBLICATIONS

Alizadeh, Arash, et al. (2015), "Condensed Mode Cooling for Ethylene Polymerization: Part I. The Effect of Different Induced Condensing Agents on Polymerization Rate", Macromolecular Chemistry and Physics, 2015, v216, pp. 903-913.

Alizadeh, Arash, et al. (2015), "Condensed Mode Cooling for Ethylene Polymerization: Part II. The Effect of Different Condensable Comonomers and Hydrogen on Polymerization Rate", Macromolecular Chemistry and Physics, 2015, v216, pp. 985-995.

Namkajorn, Montree, et al. (2016), "Condensed Mode Cooling for Ethylene Polymerization: Part III. The Impact of Induced Condensing Agents on Particle Morpohology and Polymer Properties", Macromolecular Chemistry and Physics, 2016, v217, pp. 1521-1528.

Andrade, Fabiana N, et al. (2017), "Condensed Mode Cooling for Ethylene Polymerization: Part IV. The Effect of Temperature in the Presence of Induced Condensing Agents", Macromolecular Chemistry and Physics, 2017, v218, 8pgs.

Andrade, Fabiana N, et al. (2019), "Condensed Mode Cooling for Ethylene Polymerization: Part V. Reduction of the Crystallization Rate of HDPE in the Presence of Induced Condensing Agents", Macromolecular Chemistry and Physics, 2019, v220, 9pgs.

Ishola, Niyi B., et al. (2020), "Condensed Mode Cooling for Ethylene Polymerization: Part VI. Impact of Induced Condensing Agents on Comonomer Incorporation and Polymer Properties", Macromolecular Chemistry and Physics, 2020, v14, 9pgs.

(Continued)

*Primary Examiner* — Kumar R Bhushan
(74) *Attorney, Agent, or Firm* — C. Tumey Law Group PLLC

(57) ABSTRACT

Provided are polyethylene copolymers with improved stress crack resistance, methods for making such copolymers, and films made from the same. The polyethylene copolymers include at least 95 wt % ethylene and at most 5 wt % of at least one comonomer having 3 to 18 carbon atoms; and further have a 30% single point notched constant tensile load of at least 1,000 hours, a density of 0.931 to 0.936 g/cm$^3$, a melt index (I$_2$) of 0.1 to 0.5 g/10 min, and a 25-75 chemical composition distribution index of 0.3 or more.

9 Claims, 4 Drawing Sheets

(56) References Cited

OTHER PUBLICATIONS

Alves, Rita et al. (2017) "Modelling condensed mode cooling for ethylene polymerization. Part II. Impact of Induced Condensing Agents on Ethylene Polymerization in an FBR operating in Super-Dry Mode" University de Lyon, CNRS, CPE-Lyon, UCB Lyon-1, Chimie Catalyse Polymères et Procédés (C2P2), 43 Blvd du Nov. 11, 1918, 69616 Villeurbanne Cedex, France, 52 pages.
Enable 3505 MC Performance Polymer Product Datasheet (2020), available at https://exxonmobilchemical.ides.com/datasheet.aspx?I= 58933&FMT=PDF&CULTURE=en-US&PS=PE&E=370540.

* cited by examiner

DENSITY AND CHEMICAL COMPOSITION CONTROL FOR POLYMER WITH GOOD STRESS CRACK PROPERTIES

CROSS-REFERENCE TO RELATED APPLICATIONS

This application is a National Phase Application claiming priority to PCT Application Serial No. PCT/US2021/027063, filed Apr. 13, 2021, which claims the benefit of U.S. Provisional Application 63/016,889 filed Apr. 28, 2020 entitled "Polymer Chemical Composition and Process for Producing Same" and U.S. Provisional Application 63/167,937 filed Mar. 30, 2021 entitled "Density and Chemical Composition Control for Polymer with Good Stress Crack Properties", the entireties of which are incorporated by reference herein.

FIELD OF THE INVENTION

This disclosure relates to polyethylene polymers, polymerization processes for making such polyethylene polymers, and geomembranes and films made therefrom.

BACKGROUND OF THE INVENTION

Geomembranes are very low permeability synthetic membranes, liners, or barriers used to control gas or liquid migration in a project, structure, or system. In many instances, geomembranes are made from continuous polymeric sheets or geotextiles (impregnated with asphalt, elastomer, or polymer sprays). In some instances, geomembranes involve multilayered bitumen geocomposites.

In some instances, geomembranes are prepared by melt-blown or cast film processes. Because the films tend to be relatively thick, the polymer composition should have sufficient melt strength to yield a commercially-viable, blown film. As such, a polymer having a density greater than 0.925 g/cm³ yields appropriate tensile strength for geomembrane applications. Unfortunately, crack resistance suffers as density increases. A balance is sought between tensile strength and crack resistance.

In a gas-phase copolymerization process, an alkene and a comonomer yield a polyolefin. In some instances, the process also includes hydrogen and other raw materials. The gas-phase reactor may include a fluidized-bed reactor, a compressor, and heat exchanger.

In some instances, fluidizing gas (which is passed through a distributor plate near the bottom of the reactor vessel) maintains the copolymerization reaction in a two-phase fluidized bed of gaseous reactants and granular polyolefin. Catalyst is added to the fluidized bed, and the heat of the exothermic reaction is transferred to the circulating gas stream. The gas stream is compressed, cooled in an external recycle line, and reintroduced through the distributor plate. Reactant concentrations are managed by make-up feed streams.

Several operating conditions affect the gas-phase copolymerization process and the resulting copolymer. Examples include operating temperature, comonomer type and amount, and type and quantity of catalyst. Polyolefin properties subject to process influences include molecular weight, molecular weight distribution, polymer density, melt index, impact resistance, environmental stress cracking resistance (ESCR), single point notched constant tensile load ("SP-NCTL" or simply "NCTL"), and others. Depending upon properties, some polyolefins are better suited for geomembrane applications.

BRIEF SUMMARY OF THE INVENTION

The present disclosure provides a polyethylene copolymer made from or containing ethylene and an olefin comonomer having 3 to 18 carbon atoms, wherein the polyethylene copolymer has a density in the range of 0.931 to 0.936 g/cm³, a melt index ($I_2$) in the range of 0.1 to 0.5 g/10 min, and a 25%-75% chemical composition distribution index (25-75 CCDI), described in more detail herein, of greater than 0.3, all of which can be independently adjusted by reactor conditions.

The polyethylene copolymer may include at least 95 wt % ethylene and at most 5 wt % of at least one comonomer having 3 to 18 carbon atoms, said wt % s based on the total mass of all monomers in the comonomer. The polyethylene copolymer can have a 30% single point notched constant tensile load of at least 1,000 hours, a density of 0.931 to 0.936 g/cm³, a melt index ($I_2$) of 0.1 to 0.5 g/10 min, and a 25-75 chemical composition distribution index of 0.3 or more.

It has been surprisingly and unexpected discovered that polyethylene copolymers having a unique combination of density, melt index (I2), and chemical composition distribution can exhibit significantly improved stress crack performance over similar polyethylene copolymers of the same density and MI. Indeed, it was nothing short of surprising and unexpected to observe such a significant difference in stress crack performance in polyethylene copolymers having a density in the range of 0.931 to 0.936 g/cm³ and a melt index (I2) in the range of 0.1 to 0.5 g/10 min. As such, the polyethylene copolymers provided in various embodiments herein are particularly suitable for the geomembrane market.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
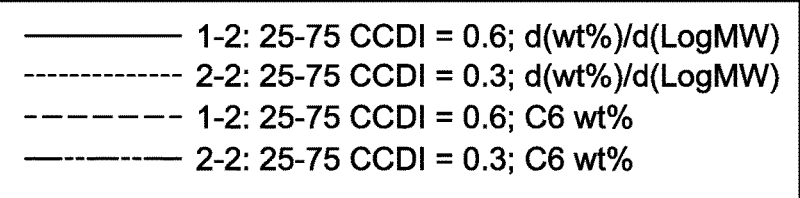
FIG. 1 is a plot of GPC4D MWD overlaid with GPC4D comonomer content of two polyethylene copolymers prepared according to one or more embodiments provided herein.
Figure 1:
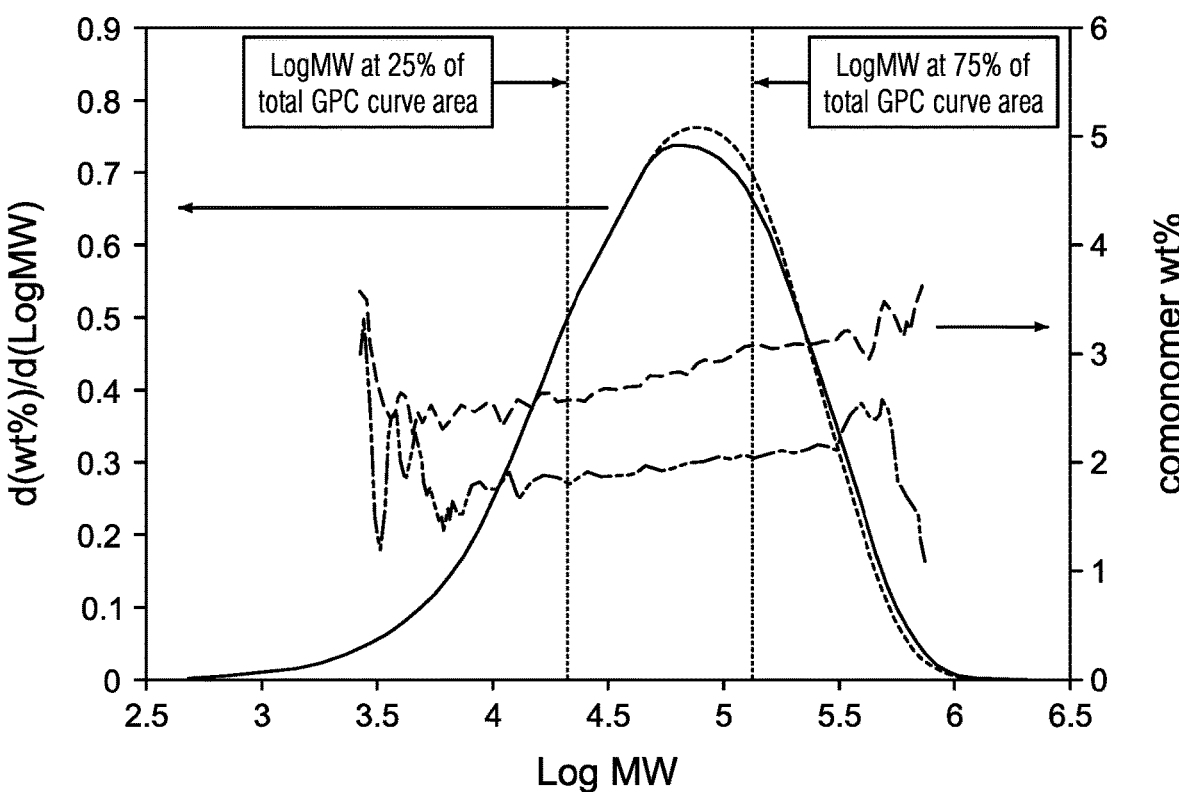

Various embodiments, versions of the disclosed compounds, processes, and articles of manufacture, will now be described, including specific embodiments and definitions that are adopted herein. While the following detailed description gives specific embodiments, those skilled in the art should appreciate that these embodiments are exemplary only, and that the "invention" can be practiced in other ways. Any reference to the invention may refer to one or more, but not necessarily all, of the compounds, processes, or articles of manufacture defined by the claims. The use of headings is for purposes of convenience only and does not limit the scope of the invention.

Definitions

As used herein, an "olefin," alternatively referred to as "alkene," is a linear, branched, or cyclic compound of carbon and hydrogen having at least one double bond. For purposes of this specification and the claims appended thereto, when a polymer or copolymer is referred to as "comprising" an olefin, the olefin present in such polymer or copolymer is the polymerized form of the olefin. For example, when a copolymer is described as having an "ethylene" content of 35 wt % to 55 wt %, it is understood that the mer unit in the copolymer is derived from ethylene in the polymerization reaction and the derived units are present at 35 wt % to 55 wt %, based upon the weight of the copolymer.

As used herein, the terms "polyethylene polymer," "polyethylene," "ethylene polymer," "ethylene copolymer," and "ethylene based polymer" mean a polymer or copolymer comprising at least 50 mol % ethylene units, or at least 70 mol % ethylene units, or at least 80 mol % ethylene units, or at least 90 mol % ethylene units, or at least 95 mol % ethylene units or 100 mol % ethylene units (in the case of a homopolymer).

As used herein, a "polymer" may refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like.

As used herein and for the claims appended hereto, an ethylene polymer having a density of more than 0.860 to less than 0.910 g/cm$^3$ is referred to as an ethylene plastomer or plastomer; an ethylene polymer having a density of 0.910 to 0.919 g/cm$^3$ is referred to as a "low density polyethylene" (LDPE); 0.919 to 0.925 g/cm$^3$ is referred to as a "linear low density polyethylene" (LLDPE); 0.925 to 0.940 g/cm$^3$ is referred to as a "medium density polyethylene" (MDPE); and an ethylene polymer having a density of more than 0.940 g/cm$^3$ is referred to as a "high density polyethylene" (HDPE). Density is determined according to ASTM D1505 using a density-gradient column on a compression-molded specimen that has been cooled to room temperature over a period of 10 minutes or more and allowed to age for a time such that the density is constant within +/−0.001 g/cm$^3$.

As used herein, and unless otherwise specified, the term "Cn" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated or unsaturated), including mixtures of hydrocarbon compounds having different values of n.

As used herein, the term "film" refers to a continuous, flat (in some instances, flexible) polymeric structure having an average thickness within a range from 0.1, or 1, or 5, or 10, or 15, or 20 μm to 40, or 75, or 100, or 150, or 200, or 250, or 1000, or 2000 μm, or such a coating of similar thickness adhered to a flexible, non-flexible or otherwise solid structure. The "film" may be made from or contain a single layer or multiple layers. Each layer may be made from or contain the polyethylene copolymer disclosed herein. For example, one or more layers of a "film" may include a mixture of the disclosed polyethylene copolymer as well as a LDPE, another LLDPE, polypropylene, or a plastomer.

As used herein, "geomembrane" refers to a continuous, flat, in some instances, flexible, polymeric structure having an average thickness within a range from 100 μm to 5.0 mm, or 1.0 to 5.0 mm, or 2.0 to 4.0 mm, and having very low permeability. The "geomembrane" may comprise (or consist of) one layer, or multiple layers, each of which may comprise (or consist of, or consist essentially of) the inventive polyethylene copolymer. The thickness of individual layers for multilayer geomembranes can be adjusted based on end-use performance, resin or copolymer employed, equipment capability, and other factors. In some instances, geomembranes are geotextiles impregnated with asphalt, elastomers, or polymers sprays. In other instances, geomembranes are multilayered bitumen geocomposites.

As used herein, a composition "free of" a component refers to a composition substantially devoid of the component, or comprising the component in an amount of less than about 0.01 wt %, by weight of the total composition.

As used herein, the term "polymerizable conditions" refers to conditions conducive to the reaction of one or more olefin monomers when contacted with an activated olefin polymerization catalyst to produce a polyolefin polymer, including a skilled artisan's selection of temperature, pressure, reactant concentrations, optional solvent/diluents, reactant mixing/addition parameters, and other conditions within at least one polymerization reactor.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

Polyethylene Copolymers

Polyethylene copolymers having a density of 0.931 to 0.936 g/cm$^3$ with significantly improved stress crack performance are provided. The polyethylene copolymers can be made from or can contain units derived from ethylene and an olefin comonomer having 3 to 18 carbon atoms. Surprisingly, it is found that linear low-density polyethylene copolymers with mild long-chain branching can achieve significantly improved stress crack resistance with the right combination of density, comonomer distribution (25-75 CCDI), and melt index (MI). In particular, it is found that for a given comonomer distribution and MI, density within the low end of acceptable density windows provide substantially improved stress crack performance, making these particular MDPEs highly suitable for applications requiring good stress crack resistance (e.g. geomembranes). Thus, polyethylene copolymers of various embodiments herein exhibit a combination of the following properties:

Density (ASTM D1505) within the range from 0.931 to 0.936 g/cm$^3$, such as from a low of any one of 0.931, 0.932, 0.933, or 0.934 g/cm$^3$ to a high of any one of 0.933, 0.934, 0.935, or 0.936 g/cm$^3$, with combinations from any low to any high contemplated (provided the high end is greater than the low end).

Melt Index (MI, also referred to as $I_2$ or $I_{2.16}$ in recognition of the 2.16 kg loading used in the test) within the range from 0.1 to 1.0 g/10 min (ASTM D1238, 190° C., 2.16 kg), such as within the range from a low of any one of 0.1, 0.2, 0.3, 0.4, or 0.5 g/10 min to a high end of any one of 0.6, 0.7, 0.8, 0.9, 1.0 g/10 min, with ranges from any low end to any high end contemplated herein (provided the high end is greater than the low end), such as 0.5 to 1.0 g/10 min, or 0.6 to 0.8 g/10 min, etc.

Comonomer incorporation reflecting a similar degree of comonomer incorporation on polymer chains of varying length of the polyethylene copolymer, which is quantified in one or both of the Composition Distribution Breadth Index (CDBI) and 25%-75% Comonomer Composition Distribution Index (25-75 CCDI), which is described in more detail below. For instance, polyethylene comonomers of various embodiments have CDBI of 85% or more, such as 90% or more; and/or 25-75 CCDI within the range from 0.0 to 1.1, such as 0.1, 0.2, 0.3, or 0.4 to a high of 0.6, 0.7, 0.8, 0.9, 1.0, or 1.1. CDBI and 25-75 CCDI are described in more detail below in connection with discussion of composition distribution.

With this combination of properties, as well as optionally others as described herein, polyethylene copolymers can exhibit extremely advantaged stress crack resistance, e.g., as measured by the Single Point Notched Constant Tensile Load ("SP-NCTL" or simply "NCTL") test per ASTM D5397, wherein the sheet is prepared from the polyethylene copolymer by compressional molding per ASTM D4703. The NCTL values are reported using the percentage of the specimen's yield stress. For example, 36% SP-NCTL refers to a tensile load that is 36% of the specimen's yield stress, which can be measured according to ASTM-D638. In some embodiments, the polyethylene copolymers can have a 36% SP-NCTL of at least 400 hours, such as at least any one of 500, 600, 700, 800, 1000, 1500, 2000, 2500, 3000, 3500, or 4000 hours. In some embodiments, the polyethylene copolymers can have a 36% SP-NCTL in the range of 400 to 800 hours, or 500 to 800 hours or 500 to 700 hours. In some embodiments, the 36% SP-NCTL is 400, 450, 500, 550, 600, 650, 700, 750, 800, or some intermediate 36% SP-NCTL. In some embodiments, the polyethylene copolymers can have a 30% SP-NCTL of at least 600 hours, such as at least any one of 600, 700, 800, 1000, 1500, 2000, 2500, 3000, 4000, 5,000, or 6,000 hours. In some embodiments, the polyethylene copolymers can have a 30% SP-NCTL in the range of 600 to 3,000 hours, or 600 to 1,500 hours or 700 to 1,500 hours, or 900 to 1,500 hours.

Moreover, according to certain embodiments in which the polyethylene composition is made using a gas phase polymerization process, chemical composition distribution (i.e., comonomer distribution along polymer chains) may be effectively controlled at least in part using induced condensing agent (ICA) concentration, while also controlling for particular melt index 12 and density. Typically, higher ICA concentration is preferred, which enables faster production rates (which are of course typically desired); however, this can negatively impact the 25-75 CCDI, which directly affects stress crack resistance. It was surprisingly and unexpectedly discovered that minor adjustments in the target density (e.g., targeting a slightly lower density) helps maintain the desired stress crack resistance, even while running higher ICA/higher rates. It was also surprisingly and unexpectedly discovered that a change in density of the ethylene copolymers does not necessarily correlate to a change in 25-75 CCDI.

Composition Distribution

The polyethylene copolymers provided herein exhibit similar comonomer incorporation along all various chain lengths, with a slightly higher degree of preferential comonomer incorporation on middle- and long-chain branches as compared to short polymer chains. This phenomenon can be characterized using a weight average molecular weight-specific (Mw-specific) Chemical Composition Distribution Index (CCDI). The Mw-specific CCDI can be considered as:

$$\frac{d(\text{Comonomer \%})}{d(\text{Log}MW)}$$

The Mw-specific CCDI is calculated by plotting comonomer % against Log(MW) (both measured by GPC with IR detector, as described below) in the region between Log (Mw) values of 4.5 and 5.25, and the Mw-specific CCDI is taken as the derivative of that comonomer % plot with respect to Log(Mw). More particularly, the plot of monomer % against Log(Mw) is fit to a line and the slope of the line in the region just described is the Mw-specific CCDI.

The polyethylene copolymers provided herein can have a MW-specific CCDI of greater than or equal to any one of 0, 0.05, 0.1, 0.15, 0.2, 0.25, 0.3, 0.35, 0.4, 0.45, 0.5, 0.6, or 0.7; and less than or equal to any one of 0.8, 0.85, 0.9, 0.95, 1.0, 1.05, or 1.1, with ranges from any foregoing low end to any foregoing high end (e.g., 0 to 1.0, such as 0.3 or 0.35 to 0.7 or 1.05) contemplated herein.

While the foregoing parameter (Mw-specific CCDI) in the region 4.5≤log(MW)≤5.25 is of particular interest, it is also useful to define this phenomenon independent of the exact values of log(MW), and instead more generally compare comonomer incorporation (short-chain branch content) at the high molecular weight chains of the polymer composition vs. the comonomer incorporation (short-chain branch content) at the low molecular weight chains of the polymer composition, irrespective of the length of those chains. For instance, a "25-75 CCDI" may be developed, in which one compares comonomer wt % at two x-values in a GPC plot of dWt %/d log(MW) vs. log(MW): (1) at the "25% value", which is the x-value (log(MW) value) at which area under the GPC curve (from x=0 to x=the 25% value) is 25% of the total area under the GPC curve; and (2) at the "75% value", which is the x-value (log(MW) value) at which area under the GPC curve (from x=0 to x=the "75%" value) is 75% of the total area under the GPC curve. The 25-75 CCDI can be found as the slope of the linear regression of comonomer wt % vs. log(MW) between these two points (essentially, the exercise is the same as described above with respect to $4.5 \leq \log(MW) \leq 5.25$, only $\log(MW)=4.5$ is replaced with $\log(MW)=$the 25% value; and $\log(MW)=5.5$ is replaced with $\log(MW)=$the 75% value).

FIG. 1 is a plot of GPC4D MWD overlaid with GPC4D comonomer content of two polyethylene copolymers disclosed in the examples section below. One is Specimen 1-2 that is represented by the "1-2" curve and the other is Specimen 2-2 that is represented by the "2-2" curve. Referring to FIG. 1, the dashed vertical line at the left portion of the curves identifies the 25% value and the dashed vertical line at the right portion of the curves identifies the 75% value. As discussed above, the 25% value identifies the area under the GPC curve that is 25% of the total area under the GPC curve and the 75% value identifies the area under the GPC curve that is 75% of the total area under the GPC curve. These values are important because these areas under the curve identify the comonomer incorporation (short-chain branch content) at the high molecular weight chains of the polymer composition vs. the comonomer incorporation (short-chain branch content) at the low molecular weight chains of the polymer composition, irrespective of the length of those chains.

Polyethylene compositions according to various embodiments can exhibit a 25-75 CCDI within the range from a low of any one of 0, 0.05, 0.1, 0.15, 0.2, 0.25, 0.3, 0.35, 0.4, 0.45, 0.5, 0.6, or 0.7; and less than or equal to any one of 0.8, 0.85, 0.9, 0.95, 1.0, 1.05, or 1.1, with ranges from any foregoing low end to any foregoing high end (e.g., 0 to 1.0, such as 0.3 or 0.35 to 0.7 or 1.05) contemplated herein.

The degree of preferential comonomer incorporation along the low, middle, and high molecular-weight chains of the polyethylene copolymer can also be characterized by an "Mn-Mz Comonomer Slope Index" (Mn-Mz CSI). This index is determined the same as the 25-75 CCDI, except that instead of using log MW="the 25% value" and log MW="the 75% value" as the low and high points of the slope determination, log MW=log Mn as the low point and log MW=log Mz as the high point for slope determination (again using linear regression in the same manner as described above for Mw-specific CCDI and 25-75 CCDI). The polyethylene copolymers provided herein may exhibit a Mn-Mz Comonomer Slope Index within the range from a low of any one of 0, 0.05, 0.1, 0.15, 0.2, 0.25, 0.3, 0.35, 0.4, 0.45, 0.5, 0.6, or 0.7; and less than or equal to any one of 0.8, 0.85, 0.9, 0.95, 1.0, 1.05, or 1.1, with ranges from any foregoing low end to any foregoing high end (e.g., 0 to 1.0, such as 0.3 or 0.35 to 0.7 or 1.05) contemplated herein. Further, for purposes of this calculation, Mz and Mn are determined in the same manner as set forth below for Mz and Mn of polyethylene compositions (e.g., per paragraphs [0044]-[0051] of PCT Publication WO2019/246069A).

Linear regression of the comonomer wt % vs. Log(MW) plot, whether for Mw-specific CCDI, 25-75 CCDI, Mn-Mz CSI or otherwise, may be carried out by any suitable method, such as linear regression fit of comonomer wt % vs. Log(MW) by using suitable software, such as EXCEL™ from Microsoft. Linear regression should be carried out with a minimum of 30 data points for comonomer wt % vs. Log(MW), preferably greater than or equal to 100 data points.

Another parameter useful for demonstrating the similar degree of comonomer incorporation along low, middle, and high molecular-weight chains of the polyethylene copolymer is the Composition Distribution Breadth Index (CDBI). As noted, the polyethylene copolymers can have a CBDI of 85% or more, such as 90% or more. CDBI is defined as the weight percent of the copolymer molecules having a comonomer content within 50% of the median total molar comonomer content, and it is described in U.S. Pat. No. 5,382,630, which is hereby incorporated by reference. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

The polyethylene copolymer may be the polymerization product of an ethylene monomer and one or more olefin comonomers, preferably alpha-olefin comonomers. Alpha-olefin comonomers can have 3 to 12 carbon atoms, or from 4 to 10 carbon atoms, or from 4 to 8 carbon atoms. Olefin comonomers can be selected from the group consisting of propylene, 1-butene, 1-pentene, 1-hexene, 1-heptene, 1-octene, 4-methylpent-1-ene, 1-decene, 1-dodecene, 1-hexadecene, and the like, and any combination thereof, with 1-butene, 1-hexene, and/or 1-octene particularly preferred. In some embodiments, a polyene is used as a comonomer. In some embodiments, the polyene is selected from the group consisting of 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, and olefins formed in situ in the polymerization medium. In some embodiments, comonomers are selected from the group consisting of isoprene, styrene, butadiene, isobutylene, chloroprene, acrylonitrile, and cyclic olefins. In some embodiments, combinations of the olefin comonomers are utilized. In some embodiments, the olefin comonomer is selected from the group consisting of 1-butene and 1-hexene. The olefin comonomer content of the polyethylene copolymer can range from a low of about 0.1, 1.0, 3.0, 4.0, or 4.5 wt % to a high of about 7.5, 8.0, 9.0, 10.0, 12.0, 15.0, or 20.0 wt %, on the basis of total weight of monomers in the polyethylene copolymer. The balance of the polyethylene comonomer is made up of units derived from ethylene (e.g., from a low of 80.0, 85.0, 88.0, 90.0, 91.0, 92.0, or 92.5 wt % to a high of 95.5, 96.0, 97.0, 99.0, or 99.9 wt %). Ranges from any foregoing low end to any foregoing high end are contemplated herein (e.g., 88.0 to 99.9 wt %, such as 90.0 to 97.0 wt % ethylene-derived units and the balance olefin comonomer-derived content).

The polyethylene copolymers can also have a high load melt index (HLMI) (also referred to as $I_{21}$ or $I_{21.6}$ in recognition of the 21.6 kg loading used in the test) within the range from a low of 10, 11, 12, or 13 g/10 min to a high of 15, 16, 17, 18, 19, 20, 25, 30, or 40 g/10 min; with ranges from any of the foregoing lows to any of the foregoing highs contemplated herein (e.g., 10 to 40 g/10 min, such as 20 to 35 g/10 min, or 20 to 30 g/10 min). The term "high load melt index" ("HLMI"), is the number of grams extruded in 10 minutes under the action of a standard load (21.6 kg) and is an inverse measure of viscosity. As provided herein, HLMI ($I_{21}$) is determined according to ASTM D1238 (190° C./21.6 kg) and is also sometimes referred to as 121 or 121.6.

The polyethylene copolymers can also have a melt index ratio (MIR, defined as the ratio of $I_{21.6}/I_{2.16}$) within the range from a low of any one of 35, 40, or 45 to a high of any one of 50, 60, or 70, with ranges from any of the foregoing lows to any of the foregoing highs contemplated herein (e.g., 40 to 70, such as 45 to 70, or 45 to 65). Alternatively, MIR can be less than or equal to 70, 65, 45, or 35. The "melt index ratio" ("MIR") provides an indication of the amount of shear thinning behavior of the polymer and is a parameter that can be correlated to the overall polymer mixture molecular weight distribution data obtained separately by using Gel Permeation Chromatography ("GPC") and possibly in combination with another polymer analysis including TREF. MIR is the ratio of $I_{21}/I_2$.

The polyethylene copolymers can also have a molecular weight distribution (MWD) of about 2 to about 8. The MWD can also range from a low of about 2, 3, or 4 to a high of about 5, 6, or 8. MWD is defined as the weight average molecular weight (Mw) divided by number-average molecular weight (Mn).

Weight-average molecular weight (Mw) of polyethylene copolymers of various embodiments may be within the range from 70,000 to 125,000 g/mol; number-average molecular weight (Mn) may be within the range from 20,000 to 40,000 g/mol; and z-average molecular weight (Mz) may be within the range from 150,000 to 280,000 g/mol.

Polyethylene copolymers of various embodiments may also exhibit long-chain branching index (LCB Index, also referred to as g'(vis) or g' index) within the range from 0.8 or 0.85 to 0.95, reflecting a measurable, albeit minor, degree of long-chain branching.

The distribution and the moments of molecular weight (Mw, Mn, Mz, Mw/Mn, Mz/Mn, etc.) and the monomer/comonomer content ($C_2$, $C_4$, $C_6$ and/or $C_8$, and/or others, etc.), as well as g'(vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 μm Mixed-B LS columns are used to provide polymer separation. Detailed analytical principles and methods for molecular weight determinations and g'(vis) are described in paragraphs [0044]-[0051] of PCT Publication WO2019/246069A1, which are incorporated herein by reference (noting that the equation c=/// referenced in Paragraph [0044] therein for concentration (c) at each point in the chromatogram, is c=β1, where β is mass constant and I is the baseline-subtracted IR5 broadband signal intensity (I)). Unless specifically mentioned, all the molecular weight moments used or mentioned in the present disclosure are determined according to the conventional molecular weight (IR molecular weight) determination methods (e.g., as referenced in Paragraphs [0044]-[0045] of the just-noted publication), noting that for the equation in such Paragraph [0044], a=0.695 and K=0.000579(1–0.75 Wt) are used, where Wt is the weight fraction for comonomer, and further noting that comonomer composition is determined by the ratio of the IR5 detector intensity corresponding to $CH_2$ and $CH_3$ channel calibrated with a series of PE and PP homo/copolymer standards whose nominal values are predetermined by NMR or FTIR (providing methyls per 1000 total carbons ($CH_3$/1000 TC)) as noted in Paragraph [0045] of the just-noted PCT publication). Other parameters needed can be found in the referenced passage in the WO2019/246069A1 publication, but some are included here for convenience: n=1.500 for TCB at 145° C.; I=665 nm; dn/dc=0.1048 ml/mg.

In various embodiments, the polyethylene copolymers can have a Complex Shear Viscosity (η*) @ 0.01 rad/sec and 190° C. is in the range of 40,000 to 103,000 Pa·s; or from a low of any one of 40,000; 50,000; 55,000; 60,000; 63,000; 65,000; or 67,000 Pa·s, to a high of any one of 70,000; 75,000; 78,000; 80,000; 85,000; 90,000; 95,000;

100,000; or 103,000 Pa·s, with ranges from any low end to any high end contemplated (e.g., 63,000 to 75,000 Pa·s).

Complex Shear Viscosity (η*) @ 0.01 rad/sec and 190° C. may be in the range from 1,400 to 2000 Pa·s; such as from a low end of any one of 1,400; 1,500; 1,550; or 1,600 Pa·s to a high end of any one of 1,700; 1,750; 1,800; 1,850; 1,900; 1,950; or 2,000 Pa·s, with ranges from any foregoing low to any foregoing high also contemplated (e.g., 1,600 to 1,700 Pa·s).

In some embodiments, the polyethylene copolymers have a Shear Thinning Ratio (η*@ 0.01/100)>28, or in the range of 28 to 53, or 30 to 50, or 38 to 43. In some embodiments, the η*@ 0.01/100 is 31, 33, 34, 35, 36, 37, 38, 39, 40, 41, 42, 43, 44, 45, 46, 47, 48, 49, or 50, or an intermediate shear thinning ratio.

"Complex Shear Viscosity (η*)," reported in Pascal second, was measured at 0.01 rad/sec and 100 rad/sec. Complex shear viscosity is also referred to as "dynamic viscosity" or "dynamic shear viscosity." Specifically, dynamic shear melt rheological data was measured with an Advanced Rheometrics Expansion System (ARES) using parallel plates (diameter=25 mm) in a dynamic mode under nitrogen atmosphere. The rheometer was thermally stable at 190° C. for at least 30 minutes before inserting compression-molded specimen onto the parallel plates. To determine the specimen's viscoelastic behavior, frequency sweeps in the range from 0.01 to 628 rad/s were carried out at a temperature of 190° C. under constant strain. Depending on the molecular weight and temperature, strains of 10% and 15% were used and linearity of the response was verified. A nitrogen stream was circulated through the oven to minimize chain extension or cross-linking during the experiments. The specimens were compression molded at 190° C., without stabilizers. A sinusoidal shear strain was applied. The shear thinning slope (STS) was measured using plots of the logarithm (base ten) of the dynamic viscosity versus logarithm (base ten) of the frequency. The slope is the difference in the log(dynamic viscosity) at a frequency of 100 $s^{-1}$ and the log(dynamic viscosity) at a frequency of 0.01 $s^{-1}$ divided by 4. The complex shear viscosity (η*) versus frequency (ω) curves were fitted using the Cross model (as described in C. W. Macoskco, "Rheology: Principles, Measurements, and Applications", Wiley-VCH, 1994): $\eta^* = \eta_0/(1+(\lambda\omega)^{(1-n)})$.

The three parameters in this model are: $\eta_0$, the zero-shear viscosity; λ, the average relaxation time; and n, the power-law exponent. The zero-shear viscosity is the value at a plateau in the Newtonian region of the flow curve at a low frequency, where the dynamic viscosity is independent of frequency. The average relaxation time corresponds to the inverse of the frequency at which shear-thinning starts. The power-law exponent describes the extent of shear-thinning, in that the magnitude of the slope of the flow curve at high frequencies approaches 1–n on a log(η*)–log(ω) plot. For Newtonian fluids, n=1 and the dynamic complex viscosity is independent of frequency.

"Shear Thinning Ratio", which is reported as a unitless number, is characterized by the decrease of the complex viscosity with increasing shear rate. Herein, shear thinning was determined as a ratio of complex viscosity at a frequency of 0.1 rad/s to the complex viscosity at a frequency of 100 rad/s.

Blends

In some embodiments, the polyethylene copolymers can be formulated (e.g., blended) with one or more other polymer components. In some embodiments, those other polymer components are alpha-olefin polymers such as polypropylene or polyethylene homopolymer and copolymer compositions. In some embodiments, those other polyethylene polymers are selected from the group consisting of linear low density polyethylene, high density polyethylene, medium density polyethylene, low density polyethylene, and other differentiated polyethylenes.

In some embodiments, the polyethylene copolymers can be present in such formulated compositions in an amount of from 0.1 to 99.9 wt. %. In some embodiments, the upper limit on the amount of the polyethylene copolymer in such formulated compositions is 99.5 wt. %, 99.0 wt. %, 98.0 wt. %, 97.0 wt. %, 96.0 wt. %, 95.0 wt. %, 90.0 wt. %, 85.0 wt. %, 80.0 wt. %, 75.0 wt. %, 70.0 wt. %, 60.0 wt. %, 50.0 wt. %, 40.0 wt. %, 30.0 wt. %, 25.0 wt. %, 20.0 wt. %, 15.0 wt. %, 10.0 wt. %, 5.0 wt. %, 4.0 wt. %, 3.0 wt. %, 2.0 wt. %, 1.0 wt. %, or 0.5 wt. %. In some embodiments, the lower limit on the amount of the polyethylene copolymers in such formulated compositions is 99.5 wt. %, 99.0 wt. %, 98.0 wt. %, 97.0 wt. %, 96.0 wt. %, 95.0 wt. %, 90.0 wt. %, 85.0 wt. %, 80.0 wt. %, 75.0 wt. %, 70.0 wt. %, 60.0 wt. %, 50.0 wt. %, 40.0 wt. %, 30.0 wt. %, 25.0 wt. %, 20.0 wt. %, 15.0 wt. %, 10.0 wt. %, 5.0 wt. %, 4.0 wt. %, 3.0 wt. %, 2.0 wt. %, 1.0 wt. %, or 0.5 wt. %. In some embodiments, the formulated compositions include any upper and lower limit of polyethylene copolymer, such as 0.5 to 99.5 wt. %, 10.0 to 90.0 wt. %, 20.0 to 80.0 wt. %, 25.0 to 75.0 wt. %, 40.0 to 60.0 wt. %, 45.0 to 55.0 wt. %, 5.0 to 50.0 wt. %, 10.0 to 40.0 wt. %, 20.0 to 30.0 wt. %, 50.0 to 95.0 wt. %, 60.0 to 90.0 wt. %, 70.0 to 80.0 wt. %, 1.0 to 15.0 wt. %, 1.0 to 10.0 wt. %, 1.0 to 5.0 wt. %, 85.0 to 99.0 wt. %, 90 to 99.0 wt. %, or 95.0 to 99.0 wt. %. The amount of polyethylene copolymer is based on the total weight of the polymer blend.

In some embodiments, the formulated compositions can be prepared using conventional equipment and methods, such as by dry blending the individual components and subsequently melt mixing in a mixer, or by mixing the components together directly in a mixer. In some embodiments, the mixer is a Banbury mixer, a Haake mixer, a Brabender internal mixer, or a single or twin-screw extruder, which may include a compounding extruder and a side-arm extruder used directly downstream of a polymerization process.

In certain embodiments, blends of higher density polyethylene copolymers and lower density polyethylene copolymers are desirable. For example, blends having a ratio (higher density polyethylene copolymers to lower density polyethylene copolymers) of 60/40 or 80/20 are preferred. Blends can be, for example, MDPE and LLDPE; MDPE and LDPE; HDPE and LDPE; HDPE and LLDPE; or HDPE and MDPE. The idea is to retain tensile strengths with the higher density component and improve NCTL with the lower density component.

In some embodiments, the formulated compositions are further made from or contain additives, which are determined based upon the end use of the formulated composition. In some embodiments, the additives are selected from the group consisting of fillers, antioxidants, phosphites, anti-cling additives, tackifiers, ultraviolet stabilizers, heat stabilizers, antiblocking agents, release agents, antistatic agents, pigments, colorants, dyes, waxes, silica, processing aids, neutralizers, lubricants, surfactants, and nucleating agents. In some embodiments, additives are present in an amount from 0.1 ppm to 5.0 wt %.

Polymerization Processes

The polyethylene copolymers can be made in solution, bulk, slurry, or gas phase polymerization systems. One or more reactors in series or in parallel can be used. In some embodiments, a catalyst component and activator can be delivered as a solution or slurry, either separately to the reactor, activated in-line just prior to the reactor or in the reactor, or preactivated and pumped as an activated solution or slurry to the reactor.

Polymerizations can be carried out in either (a) single reactor operation, wherein ethylene, olefin comonomer(s), catalyst/activator, scavenger, and optional modifiers are added continuously to a single reactor or (b) series reactor operation, wherein the components are added to each of two or more reactors connected in series. In various embodiments employing series reactors, the catalyst components may be added to the first reactor in the series. Going further, however, the catalyst component may be added to multiple reactors, with one component being added to first reactor and another component added to other reactors.

In some embodiments employing slurry polymerization, the slurry phase polymerization involves a slurry loop process. In some embodiments, the slurry polymerization process operates between 1 to about 50 atmosphere pressure range (15 psi to 735 psi, 103 kPa to 5068 kPa) or even greater, and with temperatures in the range of 0° C. to about 120° C.

In a slurry polymerization, a suspension of solid, particulate polymer is formed in a liquid polymerization diluent medium to which ethylene, the olefin comonomer(s), and the catalyst are added. The suspension including diluent is intermittently or continuously removed from the reactor where volatile components are separated from the polyethylene copolymer and recycled, optionally after a distillation, to the reactor. In some embodiments, the liquid diluent employed in the polymerization medium is an alkane having from 3 to 7 carbon atoms. In some embodiments, the alkane is branched. The medium employed should be liquid under the conditions of polymerization and relatively inert. When a propane medium is used, the process operated above the reaction diluent critical temperature and pressure. In some embodiments, the diluent is hexane or isobutane.

In various embodiments, the process is carried out in a continuous stirred tank reactor, batch reactor or plug flow reactor, or more than one reactor operated in series or parallel. These reactors may have internal cooling or heating; also or instead, monomer feed may be refrigerated.

In yet further embodiments, tubular reactors, equipped with hardware to introduce feeds, catalysts and scavengers in staged manner, are used. Such polymerization reactors may be agitated (stirred) to reduce or avoid concentration gradients. Reaction environments may include olefin comonomers acting as diluent or solvent or liquid hydrocarbons (e.g., aliphatic or aromatic fluids) acting as diluent or solvent. Such aliphatic or aromatic fluids may be selected from the group consisting of desulfurized light virgin naphtha, propane, isobutane, mixed butanes, hexane, pentane, isopentane, isohexane, cyclohexane, isooctane, and octane. In some embodiments, a perfluorocarbon or hydrofluorocarbon is used as the solvent or diluent. Such polymerizations may occur in a temperature from about 50° C. to about 250° C., or about 50° C. to about 150° C., or about 70° C. to about 150° C., and a pressure of 0.1 MPa or more, or 2 MPa or more. Upper pressure limit may be 200 MPa or less, or 120 MPa or less.

Further, the process can be operated in a supercritical phase, wherein the pressure and temperature are above the critical point of the reaction media. Temperature control in the reactor may be obtained by balancing the heat of polymerization with reactor cooling via reactor jackets or cooling coils, auto refrigeration, pre-chilled feeds, vaporization of liquid medium (diluent, monomers or solvent) or combinations thereof. In certain of these embodiments, adiabatic reactors with pre-chilled feeds are used.

In various preferred embodiments, the polymerization process includes a gas phase polymerization reaction, and in particular a fluidized bed gas phase polymerization reaction. The gas-phase polymerization may be carried out in any suitable reactor system, e.g., a stirred- or paddle-type reactor system. See U.S. Pat. Nos. 7,915,357; 8,129,484; 7,202,313; 6,833,417; 6,841,630; 6,989,344; 7,504,463; 7,563,851; and 8,101,691 for discussion of suitable gas phase fluidized bed polymerization systems, which are well known in the art.

In such polymerization processes, a gas-phase, fluidized-bed process is conducted by passing a stream containing ethylene and an olefin comonomer continuously through a fluidized-bed reactor under reaction conditions and in the presence of a catalyst composition at a velocity sufficient to maintain a bed of solid particles in a suspended state. A stream (which may be called a "cycle gas" stream) containing unreacted ethylene and olefin comonomer is continuously withdrawn from the reactor, compressed, cooled, optionally partially or fully condensed, and recycled back to the reactor. Prepared polyethylene copolymer is withdrawn from the reactor and replacement ethylene and olefin comonomer are added to the recycle stream. In some embodiments, gas inert to the catalyst composition and reactants is present in the gas stream.

The cycle gas can include induced condensing agents (ICA). An ICA is one or more non-reactive alkanes that are condensable in the polymerization process for removing the heat of reaction. In some embodiments, the non-reactive alkanes are selected from C1-C5 alkanes, e.g., one or more of propane, butane, isobutane, pentane, isopentane, hexane, as well as isomers thereof and derivatives thereof. In some instances, mixtures of two or more such ICAs may be particularly desirable (e.g., propane and pentane, propane and butane, butane and pentane, etc.). Operation of gas phase fluidized bed reactors employing ICA can take place in "dry mode" (typically less than 5 mol % total ICA concentration with respect to total cycle gas), or in "condensing" or "condensed" mode, with higher ICA concentrations. As noted, it may be desired to maximize ICA concentration for faster commercial runtimes; however, as discussed in connection with the Examples below, reducing ICA may have beneficial effects on comonomer distribution. In particular, according to various embodiments, polymerization processes may employ less than 11 mol % ICA (concentration based on total cycle gas), such as 10 mol % or less, or less than 10 mol % ICA, such as within the range from 2, 3, 4, or 5 mol % to 6, 7, 8, 9, 10, or 11 mol % (with ranges from any foregoing high to any foregoing low also contemplated), and also recognizing that either "dry mode" (less than 5 mol % ICA) or condensing mode (with relatively low ICA concentration) may be suitable for producing polyethylene compositions with the desired 25-75 CCDI. It is surprisingly found that such reductions in ICA concentration lead to increasing comonomer distribution (meaning additional comonomer incorporated onto higher-molecular-weight polymer chains), and in particular that operating at 10 mol % ICA or less may result in the desired 0.3 or greater 25-75 CCDI.

The polymerization process can be conducted substantially in the absence of catalyst poisons such as moisture, oxygen, carbon monoxide and acetylene. However, it is noted that oxygen may be added back to the reactor to alter the polymer structure and the polymer's performance characteristics.

Further, organometallic compounds can be employed as scavenging agents to remove catalyst poisons, thereby increasing the catalyst activity, or for other purposes. Adjuvants may also or instead be used in the process. Similarly, hydrogen gas may be added, thereby affecting the polymer molecular weight and distribution.

Often, a continuous cycle is employed wherein a first part of the cycle of a reactor, a cycling gas stream, otherwise known as a recycle stream or fluidizing medium, is heated in the reactor by the heat of polymerization. This heat is removed in a second part of the cycle by a cooling system external to the reactor.

The reactor pressure may vary from 100 psig (680 kPag)-500 psig (3448 kPag), or in the range of from 200 psig (1379 kPag)-400 psig (2759 kPag), or in the range of from 250 psig (1724 kPag)-350 psig (2414 kPag). In some embodiments, the reactor is operated at a temperature in the range of 60° C. to 120° C., 60° C. to 115° C., 70° C. to 110° C., 70° C. to 95° C., or 85° C. to 95° C.

The mole percent of ethylene may be from 25.0-90.0 mole percent, or 50.0-90.0 mole percent, or 70.0-85.0 mole percent, and the ethylene partial pressure is in the range of from 75 psia (517 kPa)-300 psia (2069 kPa), or 100-275 psia (689-1894 kPa), or 150-265 psia (1034-1826 kPa), or 200-250 psia (1378-1722 kPa). Ethylene concentration in the reactor can also range from 35-95 mol %, such as within the range from a low of 35, 40, 45, 50, or 55 mol % to a high of 70, 75, 80, 85, 90, or 95 mol % and further where ethylene mol % is measured on the basis of total moles of gas in the reactor (including, if present, ethylene and/or comonomer gases as well as inert gases such as one or more of nitrogen, isopentane or other ICA(s), etc.); as with vol-ppm hydrogen, this measurement may for convenience be taken in the cycle gas outlet rather than in the reactor itself. Comonomer concentration can range from 0.2-1.0 mol %, such as within the range from a low of 0.2, 0.3, 0.4 or 0.5 mol % to a high of 0.65, 0.70, 0.75, 0.80, 0.85, 0.90, 0.95, or 1.0 mol %.

Catalyst

The catalysts employed in the polymerization are preferably metallocene catalysts. In particular, metallocene catalysts may be selected from the catalysts described in Patent Cooperation Treaty Publication Nos. WO1993008221, WO1996008520, and WO2007130277, incorporated herein by reference for all purposes. For instance, the catalysts may be silica-supported metallocene catalyst prepared from compositions comprising dimethylsilylbis(tetrahydroindenyl) zirconium dichloride metallocene and methylalumoxane cocatalyst.

Articles of Manufacture

The polyethylene copolymers described herein can be particularly suitable for making end-use articles of manufacture such as films (e.g., as may be formed by lamination, extrusion, coextrusion, casting, and/or blowing); as well as other articles of manufacture as may be formed, e.g., by rotomolding or injection molding. Film formation processes are well known in the art, and the skilled artisan will readily recognize applications of LLDPE for film making. However, we note that a particularly preferred use of the polyethylene copolymer provided herein is in a geomembrane film. The polyethylene copolymer can also be formed into other articles of manufacture by cast film extrusion, blown film extrusion, rotational molding or injection molding processes. In some embodiments, the polyethylene copolymer can be used in a formulated composition.

In some embodiments, the article of manufacture is a film. The film can be formed by lamination, extrusion, or coextrusion. In some embodiments, the film can be embossed.

Particularly useful films include those where stress crack resistance is important, such as for example geomembranes. Methods of using polymers to make geomembranes are well known in the art and are not discussed further herein.

Listing of Specific Embodiments

The foregoing discussion can be further described with reference to any one or more of the following numbered embodiments E1 to E11.

E1. A polyethylene copolymer with improved stress crack resistance, comprising at least 95 wt % ethylene; and at most 5 wt % of at least one comonomer having 3 to 18 carbon atoms, wherein the polyethylene copolymer has a 30% single point notched constant tensile load of at least 1,000 hours, a density of 0.931 to 0.936 g/cm³, a melt index ($I_2$) of 0.1 to 0.5 g/10 min, and a 25-75 chemical composition distribution index of 0.3 or more.

E2. A polyethylene copolymer with improved stress crack resistance, comprising: equal to or greater than 95 wt % ethylene; and equal to or less than 5 wt % of at least one comonomer having 3 to 18 carbon atoms, wherein the polyethylene copolymer has a 30% single point notched constant tensile load of at least 1,000 hours, a density of 0.931 to 0.936 g/cm³, a melt index ($I_2$) of 0.1 to 0.5 g/10 min, MIR of a 30 to 70, a 25-75 chemical composition distribution index of 0.3 or more.

E3. A polyethylene copolymer with improved stress crack resistance, comprising: equal to or greater than 95 wt % ethylene; and equal to or less than 5 wt % of at least one comonomer having 3 to 18 carbon atoms, wherein the polyethylene copolymer has a 30% single point notched constant tensile load of at least 1,000 hours, a 36% single point notched constant tensile load of at least 600 hours, a density of 0.931 to 0.936 g/cm³, a melt index ($I_2$) of 0.1 to 0.5 g/10 min, MIR of a 30 to 70, a 25-75 chemical composition distribution index of 0.3 or more.

E4. The polyethylene copolymer of any preceding embodiment E1 to E3, further having a MWD of 3 to 6.

E5. The polyethylene copolymer of any preceding embodiment E1 to E4, further having a CBDI of 85% or more.

E6. The polyethylene copolymer of any preceding embodiment E1 to E5, further having a branching index ($g'_{vis}$) of 0.85 to 0.95.

E7. The polyethylene copolymer of any preceding embodiment E1 to E6, wherein the comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin.

E8. The polyethylene copolymer of any preceding embodiment E1 to E7, wherein the comonomer is selected from the group consisting of 1-butene and 1-hexene.

E9. The polyethylene copolymer of any preceding embodiment E1 to E8, wherein the comonomer is 1-hexene.

E10. A film made of the polyethylene copolymer of any preceding embodiment E1 to E9.

E11. The embodiment of E10, wherein the film is a geomembrane.

EXAMPLES

The foregoing discussion can be further described with reference to the following non-limiting examples. Polyethylene copolymers, according to one or more embodiments provided herein, were produced in four gas phase polymerization systems (Examples 1-5). Each copolymer specimen was characterized for its density, complex shear viscosity at 0.01 rad/sec, 100 rad/sec, and 190° C., shear thinning ratio at 0.01/100 rad/s, Mw-specific CCDI, 25-75 CCDI, Mn-Mz CSI, and 30%, 36% single point-notched constant tensile load (SP-NCTL). The "Single Point Notched Constant Tensile Load (SP-NCTL)", reported in hours, was an Exxon-Mobil-modified version of ASTM D5397-07 test method to evaluate stress crack resistance of a polyolefin. The sample polymer was compression-molded using ASTM D4703, Procedure C of Annex A1, into a plaque to provide dumbbell bars, not geomembrane samples as directed by ASTM D5397. Five fresh notched ASTM D1822 Type L dumbbell bars were mounted into a constant stress loading apparatus. The apparatus contained 10% aqueous solution of Igepal CO-630 by volume. For the 36% Single Point NCTL test (SP-NCTL), the notched bars were subjected to a content stress load equivalent to 36% yield stress. For the 30% SP-NCTL, the notched bars were subjected to a content stress load equivalent to 30% yield stress. For each of the 30% and 36% tests, the average value of the times for five specimens to break is called "failure time" and measured in hours.

The catalyst used in each polymerization was a silica-supported metallocene catalyst. The metallocene was dimethylsilylbis(tetrahydroindenyl) zirconium dichloride (Me2Si(H4Ind)2ZrCl2). Methylalumoxane (MAO) was the activator/cocatalyst. The preparation of the catalyst followed the procedure as described in U.S. Pat. No. 6,476,171B1, incorporated herein by reference for all purposes. A solution of 1125 ml of 30 wt % MAO in toluene as determined by reference to the total aluminum content which may include unhydrolyzed trimethylaluminum (TMA) was charged to a two gallon (7.57 liter), jacketed glass-walled reactor, equipped with a helical ribbon blender and an auger-type shaft. 1800 ml of toluene was added and stirred. A suspension of 30.8 g dimethylsilylbis(tetrahydroindenyl) zirconium dichloride (Me$_2$Si(H$_4$Ind)$_2$ZrCl$_2$; purchased from Albemarle Labs) in 320 ml of toluene was cannulated into the reactor. An additional 150 ml of toluene was used to rinse solid metallocene crystals into the reactor by cannula under nitrogen pressure. A color change from colorless to yellow/orange was noted upon addition of the metallocene to the MAO solution. The mixture was allowed to stir at 69° F. (20.6° C.) for one hour, before being transferred to a four-liter Erlenmeyer flask under nitrogen. Silica (899 g, Davison MS 948, with a pore volume of 1.65 ml/g) was charged to the reactor. Half of the solution from the 4 L Erlenmeyer flask was then transferred back to the 2 gallon (7.57 liter) stirred glass reactor. The reaction temperature rose from 70° F. (21.1° C.) to 100° F. (37.8° C.) in a five minute exotherm. The balance of the solution in the 4 liter Erlenmeyer was subsequently added back to the glass reactor, and stirred twenty minutes. Then, toluene was added (273 ml, 238 g) to dilute the active catalyst slurry, and stirred an additional twenty-five minutes. Antistat AS-990 was cannulated to the reactor and the slurry mixed for thirty minutes. Removal of solvent commenced by reducing pressure to less than 18 inches of mercury (457 mmHg) while feeding a small stream of nitrogen into the bottom of the reactor and raising the temperature from 74° F. (23.3° C.) to 142° F. (61.1° C.) over a period of one hour. Then nine and a half additional hours of drying at 142° F. (61.1° C.) to 152° F. (66.7° C.) at a vacuum which ranged from 5 inches to 22 inches Hg (177 to 559 mmHg) were used to dry the support and yield 1291.4 g of free-flowing active supported catalyst material.

The polymerization was conducted in a continuous gas phase fluidized bed reactor. The fluidized bed was made up of polymer granules. The gaseous feed streams of ethylene and hydrogen together with liquid comonomer were mixed together in a mixing tee arrangement and introduced below the reactor bed into the recycle gas line. The ICA (specified in the table below for each example) was added with the ethylene and hydrogen and also introduced below the reactor bed into the recycle gas line. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream.

The solid catalyst was injected directly into the fluidized bed using purified nitrogen as a carrier. Its rate of injection was adjusted to maintain a constant production rate of the polymer. The reacting bed of growing polymer particles is maintained in a fluidized state by the continuous flow of the make-up feed and recycle gas through the reaction zone. A superficial gas velocity of 1-3 ft/sec (0.3 to 0.9 m/sec) was used to achieve this. The reactor was operated at a total pressure of about 300 psig (2068 kPa gauge). To maintain a constant reactor temperature, the temperature of the recycle gas is continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber, which was simultaneously vented back to the reactor. This allowed for highly efficient removal of the product, while at the same time recycling a large portion of the unreacted gases back to the reactor. This product was purged to remove entrained hydrocarbons and treated with a small stream of humidified nitrogen to deactivate any trace quantities of residual catalyst and cocatalyst. The target conditions for the polymerization process in each Example are shown in Table 1.

TABLE 1

| Polymerization conditions | |
| --- | --- |
| Run Conditions | |
| Bed Temperature | 193° F. |
| Reactor pressure | 290 psig |
| Ethylene partial pressure | 195 psia |
| Hydrogen/ethylene ratio | 10 ppm/mol |
| 1-hexene/ethylene ratio | 0.39 molar % |

Example 1

The polymerization was conducted with the silica-supported metallocene catalyst in a continuous gas phase fluidized bed pilot reactor having a 16.5 inch (41.9 cm) diameter with a bed height of approximately 12 feet (3.6 M) under the target reactor conditions in Table 1 with a target ICA (isopentane) concentration of 2.4 mol %. The ethylene-1-hexene copolymer specimens produced are shown in Table 2 and had an average Mw-specific CCDI and 25-75 CCDI of 0.61, average Mn-Mz CSI of 0.59.

TABLE 2

| Specimen | ICA concentration (mol %) | Mw-specific CCDI | 25-75 CCDI | Mn-Mz CSI |
| --- | --- | --- | --- | --- |
| 1-1 | 2.61 | 0.57 | 0.58 | 0.57 |
| 1-2 | 2.64 | 0.62 | 0.62 | 0.56 |
| 1-3 | 2.34 | 0.63 | 0.57 | 0.59 |
| 1-4 | 2.70 | 0.53 | 0.68 | 0.56 |
| 1-5 | 2.73 | 0.70 | 0.81 | 0.70 |
| 1-6 | 2.26 | 0.69 | 0.77 | 0.69 |
| 1-7 | 2.29 | 0.61 | 0.67 | 0.65 |
| 1-8 | 2.26 | 0.68 | 0.70 | 0.63 |
| 1-9 | 2.31 | 0.56 | 0.59 | 0.52 |
| 1-10 | 2.34 | 0.64 | 0.57 | 0.55 |
| 1-11 | 2.27 | 0.66 | 0.57 | 0.59 |
| 1-12 | 2.39 | 0.68 | 0.62 | 0.62 |
| 1-13 | 2.09 | 0.65 | 0.63 | 0.60 |
| 1-14 | 3.90 | 0.49 | 0.48 | 0.44 |
| 1-15 | 4.00 | 0.71 | 0.58 | 0.59 |
| 1-16 | 4.02 | 0.39 | 0.39 | 0.45 |

Example 2

The polymerization was conducted in the same continuous gas-phase fluidized bed pilot reactor with the same catalyst and target conditions as Example 1 but with a target ICA (isopentane) concentration of 10 mol %. The ethylene-1-hexene copolymer specimens produced are shown in Table 3 and had an average Mw-specific CCDI of 0.33, and an average 25-75 CCDI and Mn-Mz CSI of 0.31.

TABLE 3

| Specimen | ICA concentration (mol %) | Mw-specific CCDI | 25-75 CCDI | Mn-Mz CSI |
| --- | --- | --- | --- | --- |
| 2-1 | 10.85 | 0.31 | 0.30 | 0.28 |
| 2-2 | 9.70 | 0.31 | 0.32 | 0.28 |
| 2-3 | 10.00 | 0.24 | 0.14 | 0.22 |
| 2-4 | 9.99 | 0.42 | 0.45 | 0.41 |
| 2-5 | 10.00 | 0.38 | 0.36 | 0.33 |

Example 3

The polymerization was conducted in a commercial-scale continuous gas-phase fluidized bed reactor with the same catalyst and target conditions as Example 1 but with a target ICA (isopentane) concentration of 17 mol %. The ethylene-1-hexene copolymer specimens produced are shown in Table 4 and had an average Mw-specific CCDI of 0.12, an average 25-75 CCDI of 0.16, and an average Mn-Mw CSI of 0.15.

TABLE 4

| Specimen | ICA concentration (mol %) | Mw-specific CCDI | 25-75 CCDI | Mn-Mz CSI |
|---|---|---|---|---|
| 3-1 | 16.30 | 0.10 | 0.19 | 0.13 |
| 3-2 | 18.00 | 0.13 | 0.28 | 0.21 |
| 3-3 | 16.40 | 0.15 | 0.19 | 0.19 |
| 3-4 | 17.90 | 0.05 | 0.15 | 0.13 |
| 3-5 | 16.30 | 0.06 | 0.06 | 0.08 |
| 3-6 | 17.10 | 0.21 | 0.13 | 0.19 |
| 3-7 | 16.54 | 0.14 | 0.11 | 0.14 |

Example 4

The polymerization was conducted in another commercial-scale continuous gas-phase fluidized bed reactor with the same catalyst and target conditions as Example 1 but at a target ICA (mixed C4-C5 alkanes) concentration of 23 mol %. The ethylene-1-hexene copolymer specimens produced are shown in Table 5 and had an average Mw-specific CCDI of 0.07, a 25-75 CCDI of 0.06, and a Mn-Mz CSI of 0.09.

TABLE 5

| Specimen | ICA concentration (mol %) | Mw-specific CCDI | 25-75 CCDI | Mn-Mz CSI |
|---|---|---|---|---|
| 4-1 | 22.20 | 0.13 | 0.11 | 0.14 |
| 4-2 | 22.35 | 0.05 | 0.09 | 0.07 |
| 4-3 | 22.93 | −0.01 | 0.01 | 0.06 |
| 4-4 | 21.89 | 0.04 | 0.06 | 0.08 |
| 4-5 | 22.00 | 0.10 | 0.08 | 0.10 |
| 4-6 | 21.83 | 0.09 | 0.08 | 0.09 |
| 4-7 | 22.71 | 0.07 | 0.07 | 0.12 |

Example 5

The polymerization was conducted in a commercial-scale continuous gas-phase fluidized bed reactor with the same catalyst and target conditions as Example 1 but at a target ICA (mixed C4-C5 alkanes) concentration of 23 mol %. The ethylene-1-hexene copolymer specimens produced (5-1 and 5-2) had an average Mw-specific CCDI of 0.1, a 25-75 CCDI of 0.1, and a Mn-Mz CSI of 0.1.

TABLE 6

| Specimen | ICA concentration (mol %) | Mw-specific CCDI | 25-75 CCDI | Mn-Mz CSI |
|---|---|---|---|---|
| 5-1 | 24.71 | 0.01 | 0.0 | 0.04 |
| 5-2 | 23.66 | 0.11 | 0.01 | 0.11 |

Table 7 below shows MI, Density, 36% NCTL and 30% NCTL performance for specimens 1-1 through 5-2 of Examples 1-5.

TABLE 7

| Specimen | Melt Index (I2, 190 C., g/10 min) | Density (g/cc) | 36% NCTL (hrs to failure) | 30% NCTL (hrs to failure) |
|---|---|---|---|---|
| 1-1 | 0.59 | 0.935 | 1007 | 4064 |
| 1-2 | 0.51 | 0.934 | 1360 | 4414 |
| 1-3 | 0.68 | 0.935 | 1007 | 2449 |
| 1-4 | 0.73 | 0.936 | 259 | 594 |

TABLE 7-continued

| Specimen | Melt Index (I2, 190 C., g/10 min) | Density (g/cc) | 36% NCTL (hrs to failure) | 30% NCTL (hrs to failure) |
|---|---|---|---|---|
| 1-5 | 0.73 | 0.935 | 426 | 2496 |
| 1-6 | 0.47 | 0.934 | 513 | 4535 |
| 1-7 | 0.58 | 0.935 | 1317 | 3218 |
| 1-8 | 0.54 | 0.935 | 1317 | 4535 |
| 1-9 | 0.70 | 0.938 | 97 | 237 |
| 1-10 | 0.67 | 0.939 | 155 | 338 |
| 1-11 | 0.65 | 0.937 | 187 | 552 |
| 1-12 | 0.44 | 0.938 | 583 | 2288 |
| 1-13 | 0.53 | 0.936 | 958 | 3643 |
| 1-14 | 0.40 | 0.938 | 133 | 750 |
| 1-15 | 0.41 | 0.935 | — | 2083 |
| 1-16 | 0.41 | 0.937 | 580 | 1172 |
| 2-1 | 0.54 | 0.936 | 392 | 1154 |
| 2-2 | 0.49 | 0.939 | 103 | 193 |
| 2-3 | 0.42 | 0.934 | 970 | 2083 |
| 2-4 | 0.46 | 0.938 | 413 | 516 |
| 2-5 | 0.40 | 0.936 | — | 1364 |
| 3-1 | 0.52 | 0.936 | 695 | 934 |
| 3-2 | 0.45 | 0.936 | 905 | 3172 |
| 3-3 | 0.50 | 0.936 | 713 | 1359 |
| 3-4 | 0.47 | 0.936 | 522 | 1435 |
| 3-5 | 0.48 | 0.936 | 446 | 1218 |
| 3-6 | 0.43 | 0.936 | 647 | 1766 |
| 3-7 | 0.49 | 0.937 | 337 | — |
| 4-1 | 0.49 | 0.936 | 942 | 2435 |
| 4-2 | 0.47 | 0.936 | 561 | 730 |
| 4-3 | 0.49 | 0.937 | 380 | 861 |
| 4-4 | 0.52 | 0.936 | 537 | 643 |
| 4-5 | 0.45 | 0.936 | 557 | 778 |
| 4-6 | 0.50 | 0.937 | 198 | — |
| 4-7 | 0.47 | 0.937 | 302 | — |
| 5-1 | 0.48 | 0.932 | — | 4000 |
| 5-2 | 0.51 | 0.932 | — | 4039 |

The relationship between ICA concentration and 25-75 CCDI for the copolymer specimens of Examples 1-5 were investigated. It was surprisingly discovered that the 25-75 CCDI varies with the concentration of ICA in the polymerization process. In an intermediate range of 25-75 CCDI less than and more than the target value of 10 mol % of Example 2, the 25-75 CCDI of the ethylene copolymer increases more than would be expected through a normal error range, reflecting an increased amount of 1-hexene comonomer incorporated in the high molecular weight fractions of the copolymer, thereby increasing the d(comonomer %) value in the 25-75 CCDI formula. The effect of changes in ICA concentration and thus on 25-75 CCDI are surprisingly greater at lower ICA concentrations than at concentrations typically used in commercial copolymerization conditions (17 mol % and more). The effect on 25-75 CCDI of decreasing the concentration of ICA is surprising because ICA is considered inert and has been thought to not have an effect on 25-75 CCDI values. More particularly, as the ICA concentration is decreased from a target of 23 mol % as in Example 4 to 17 mol % as in Example 3, the average 25-75 CCDI value increases from 0.06 to 0.16. Error ranges (error bars) were computed for Examples 1-5 and are shown in FIG. 2.

Figure 2:
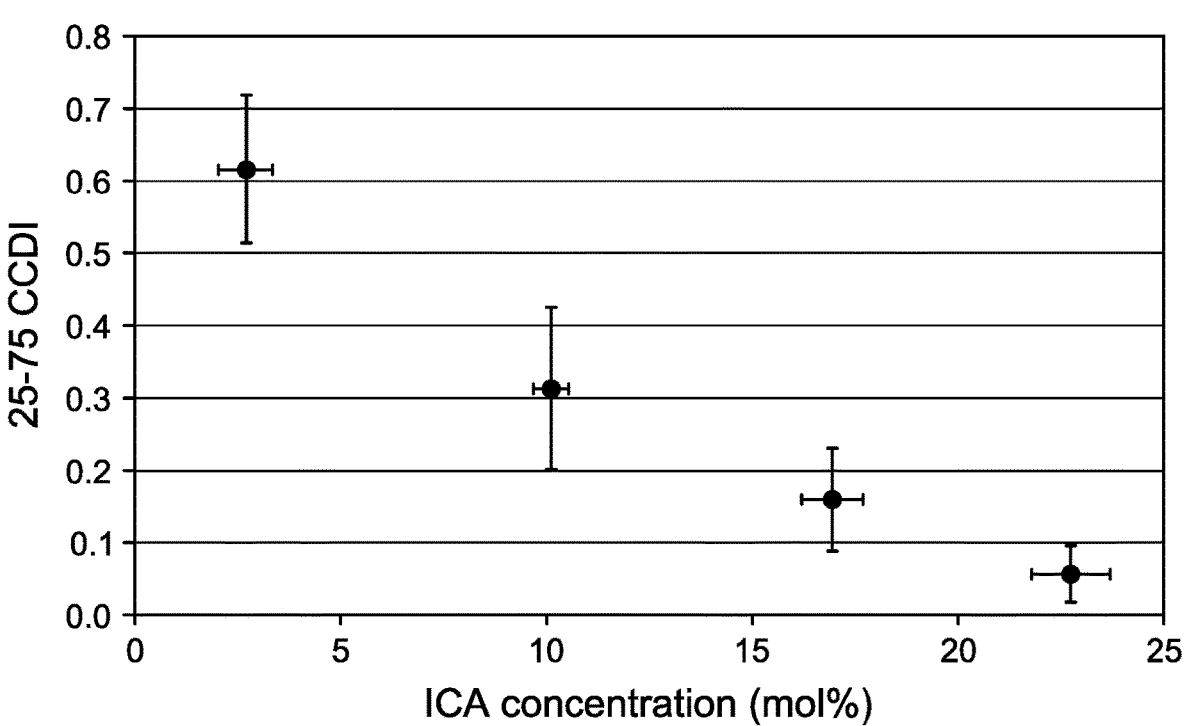
FIG. 2 is a graphical illustration of a relationship between ICA content and 25-75 CCDI.

FIG. 2 is a graphical illustration of the relationship between ICA content and 25-75 CCDI for Examples 1-5. Overlapping error bars in 25-75 CCDI for the specimens of Examples 3 and 4 reflect the limited magnitude of this change of ICA concentration on 25-75 CCDI as being within an error range. However, further reducing the target ICA concentration from a target of 17 mol % as in Example 3 to 10 mol % as in Example 2 results in a greater increase in the average 25-75 CCDI from 0.16 to 0.31, outside the error bars of these averages. Further reduction of ICA concentration to a target of about 2.5 mol % as in Example 1 increased the 25-75 CCDI further to 0.61, again outside the error bars. Thus, in the copolymerization of ethylene with 1-hexene in a continuous fluidized-bed gas phase polymerization process, reducing the ICA concentration from higher concentrations (e.g., 17 to 23 mol % or more) to about 10 mol % or less can therefore be expected to produce copolymers with a 25-75 CCDI greater than 0.31. This leads to the perhaps counterintuitive result that although lower ICA concentration may reduce runtimes, it could provide substantial advantages in the target properties, particularly when stress crack resistance is desired.

Figure 3:
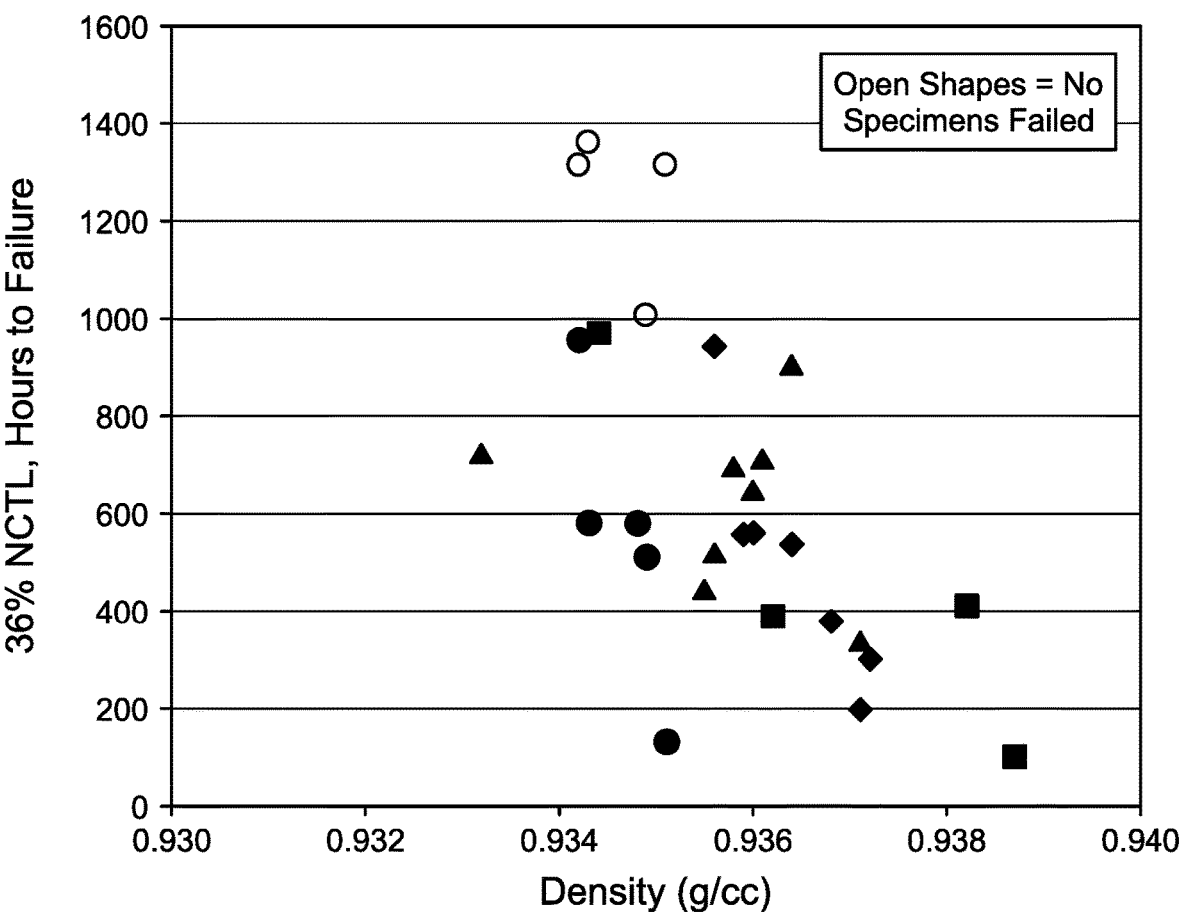
FIG. 3 shows the relationship between density and 36% NCTL performance of polyethylene copolymers having 0.5 MI and a 25-75 CCDI ranging from 0.1 to 0.6, according to one or more embodiments provided herein.
Figure 4:
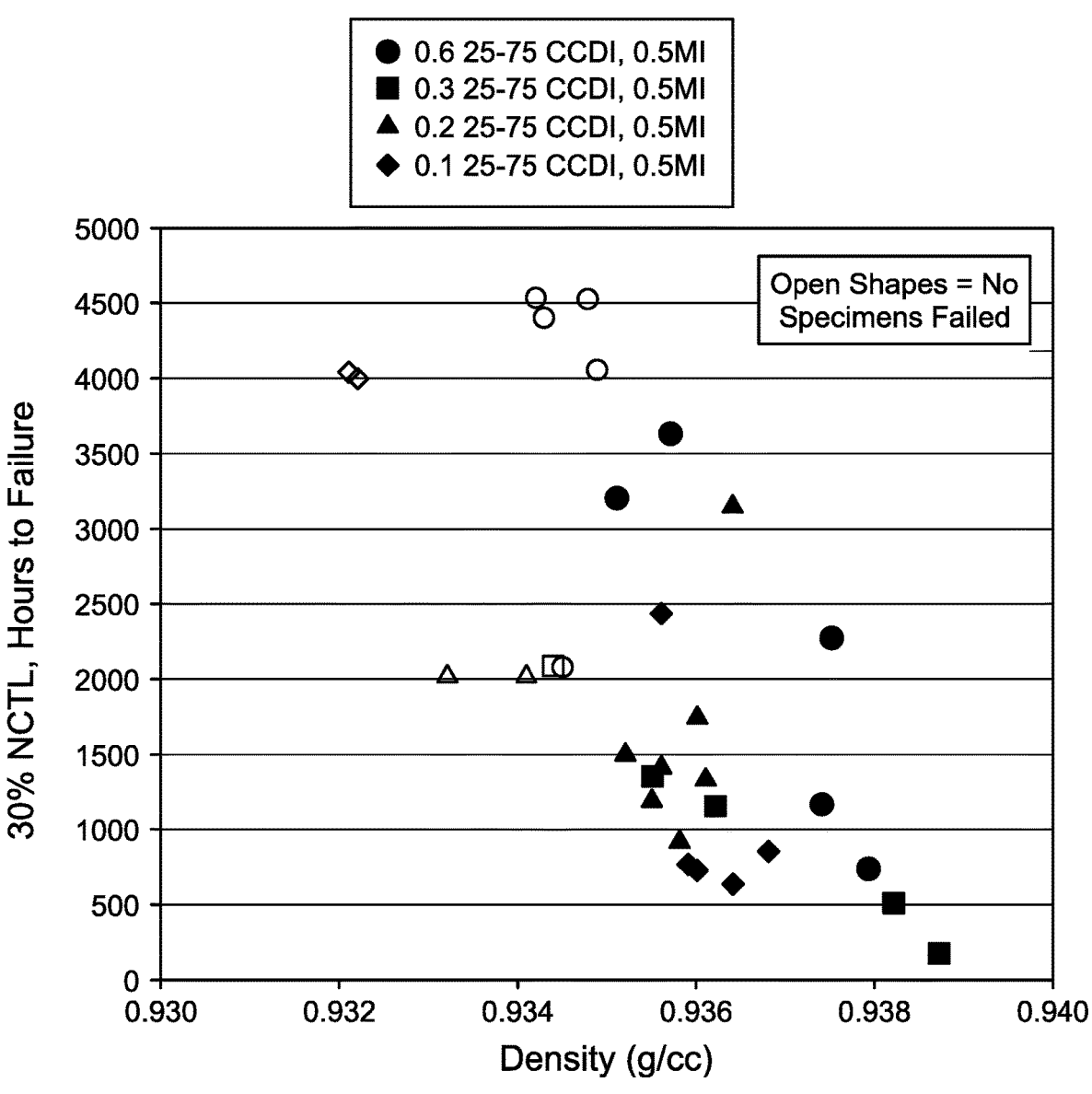
FIG. 4 shows the relationship between density and 30% NCTL performance of polyethylene copolymers having 0.5 MI and a 25-75 CCDI ranging from 0.1 to 0.6, according to one or more embodiments provided herein.

The relationship between density and NCTL at constant 25-75 CCDI and MI were investigated. Comparing specimen with similar MI and 25-75 CCDI, those specimens with lower density had directionally longer durations to failure in both 36% and 30% NCTL testing. FIG. 3 (36% NCTL) and FIG. 4 (30% NCTL) help further illustrate this observation. FIG. 3 shows the relationship between density and 36% NCTL performance of Examples 1-5 having 0.5 MI and a 25-75 CCDI ranging from 0.1 to 0.6. FIG. 4 shows the relationship between density and 30% NCTL performance of Examples 1-5 having 0.5 MI and a 25-75 CCDI ranging from 0.1 to 0.6.

Overall, the best NCTL values (30% NCTL>1000 hrs, 36% NCTL>800 hrs were obtained by the polyethylene copolymers having 0.5 MI, >0.3 25-75 CCDI, and density 0.935 to 0.931 g/cc, with top performers 36% NCTL>1000 hrs and 30% NCTL>4000 hrs, as reported in Table 7.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

All priority documents are herein fully incorporated by reference for all purposes and for all jurisdictions in which such incorporation is permitted and to the extent such description is consistent with the present disclosure. Further, all documents and references cited herein, including testing procedures, publications, patents, journal articles, etc. are herein fully incorporated by reference for all jurisdictions in which such incorporation is permitted and to the extent such description is consistent with the disclosure.

The term "comprising" is considered synonymous with the term "including" for purposes of Australian law. "Include" is synonymous with "include, but not limited to." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the claimed invention, additionally, the phrases do not exclude impurities and variances normally associated with the elements and materials used.

While the claimed invention is described with respect to a number of embodiments and examples, those skilled in the art, having benefit of this disclosure, will appreciate that other embodiments can be devised which do not depart from the scope and spirit of the disclosure.

What is claimed is:

1. A polyethylene copolymer with improved stress crack resistance, comprising:

at least 95 wt % ethylene-derived units; and at most 5 wt % of units derived from at least one comonomer having 3 to 18 carbon atoms, wherein the polyethylene copolymer has a 30% single point notched constant tensile load of at least 1,000 hours, a density of 0.931 to 0.936 g/cm$^3$, a melt index (I2) of 0.1 to 0.5 g/10 min, and a 25-75 chemical composition distribution index (25-75 CCDI) of 0.3 or more.

2. The polyethylene copolymer of claim 1, further having a melt index ratio (MIR) of 30 to 70.

3. The polyethylene copolymer of claim 1, further having a 36% single point notched constant tensile load of at least 600 hours.

4. The polyethylene copolymer of claim 1, further having one or more of the following properties:

(a) a molecular weight distribution (MWD) of 3 to 6;

(b) a Composition Distribution Breadth Index (CDBI) of 85% or more; and (c) a branching index (g'vis) of 0.85 to 0.95.

5. The polyethylene copolymer of claim 4, having all of the properties (a)-(c).

6. The polyethylene copolymer of claim 1, wherein the comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin.

7. The polyethylene copolymer of claim 1, wherein the comonomer is selected from the group consisting of 1-butene, 1-hexene, and 1-octene.

8. The polyethylene copolymer of claim 1, wherein the comonomer is 1-hexene.

9. A film made of the polyethylene copolymer of claim 1.

* * * * *